United States Patent
Berry et al.

(10) Patent No.: US 11,012,303 B2
(45) Date of Patent: May 18, 2021

(54) CONFIGURATION REPLICATION SYSTEM

(71) Applicant: Dell Products L.P., Round Rock, TX (US)

(72) Inventors: Andrew Blake Berry, Austin, TX (US); Peder Brooks Piggott, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 302 days.

(21) Appl. No.: 15/418,355

(22) Filed: Jan. 27, 2017

(65) Prior Publication Data

US 2018/0219739 A1 Aug. 2, 2018

(51) Int. Cl.
*H04L 12/24* (2006.01)
*H04L 29/08* (2006.01)

(52) U.S. Cl.
CPC ...... *H04L 41/0846* (2013.01); *H04L 41/0853* (2013.01); *H04L 41/22* (2013.01); *H04L 67/36* (2013.01); *H04L 41/0813* (2013.01)

(58) Field of Classification Search
USPC .................................................. 709/220–222
See application file for complete search history.

(56) References Cited

U.S. PATENT DOCUMENTS

| | | | | |
|---|---|---|---|---|
| 2008/0189499 | A1* | 8/2008 | Ogata | G06F 3/0662 711/162 |
| 2009/0097655 | A1* | 4/2009 | Kishimoto | G06F 21/80 380/277 |
| 2009/0177878 | A1* | 7/2009 | Gao | H04L 67/1097 713/100 |
| 2010/0281147 | A1* | 11/2010 | O'Leary | H04L 67/34 709/222 |
| 2013/0246673 | A1* | 9/2013 | Cox | H04L 41/0806 710/104 |
| 2013/0305091 | A1* | 11/2013 | Stan | H04L 43/50 714/35 |

* cited by examiner

*Primary Examiner* — Younes Naji
*Assistant Examiner* — Da T Ton
(74) *Attorney, Agent, or Firm* — Haynes and Boone, LLP

(57) ABSTRACT

A port configuration replication system includes a first networking device including a first port, and a second networking device including a second port. A management device communicates with the first networking device to provide a first networking device Graphical User Interface (GUI) that displays port configuration details for the first port. The management device then copies the port configuration details, and analyzes the port configuration details to identify port configuration replication information. The management device then communicates with the second networking device to display a second networking device GUI that provides for the configuration of the second port, and provides the port configuration replication information in the second networking device GUI in order to provide for the configuration of the second port.

20 Claims, 13 Drawing Sheets

CONFIGURATION REPLICATION SYSTEM

BACKGROUND

The present disclosure relates generally to information handling systems, and more particularly to replicating configurations across information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, networking devices, typically require some level of configuration in order to operate in a desired manner. For example, networking devices such as switches have a plurality of ports that may be configured to provide a variety of operating characteristics for that switch. In many cases, a configuration provided for a particular port on a switch may be utilized by one or more ports on that switch and/or other switches in the network. However, the replication of port configurations raises a number of issues. In conventional port configuration systems, when a user would like to replicate the same port configuration on different ports (e.g., on a first port on a first switch and a second port on a second switch), that user must make and save changes to a first running configuration on the first switch (which provide or change the port configuration for its first port.) That first running configuration must then be exported to a management system, and then imported to the second switch (e.g., via a network connection or using a local storage device), and merged with the second running configuration on the second switch. Such operations are very time consuming, and are required for each switch that includes a port to which the same configuration is to be replicated. Furthermore, the merging of running configurations only operates to update the second running configuration with information from the first running configuration, while leaving information that is not specified in the first running configuration to remain in the second running configuration, which can be undesirable in some cases.

Accordingly, it would be desirable to provide an improved configuration replication system.

SUMMARY

According to one embodiment, an Information Handling System (IHS) includes a communication subsystem; a processing system that is coupled to the communication subsystem; and a memory system that is coupled to the processing system and that include instruction that, when executed by the processing system, cause the processing system to provide a management engine that is configured to: provide for display, in response to communication with a first networking device having a first port, a first networking device Graphical User Interface (GUI) that displays port configuration details for the first port; copy the port configuration details; analyze the port configuration details to identify port configuration replication information; provide for display, in response to communication with a second networking device having a second port, a second networking device GUI that provides for the configuration of the second port; and provide the port configuration replication information in the second networking device GUI in order to provide for the configuration of the second port.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
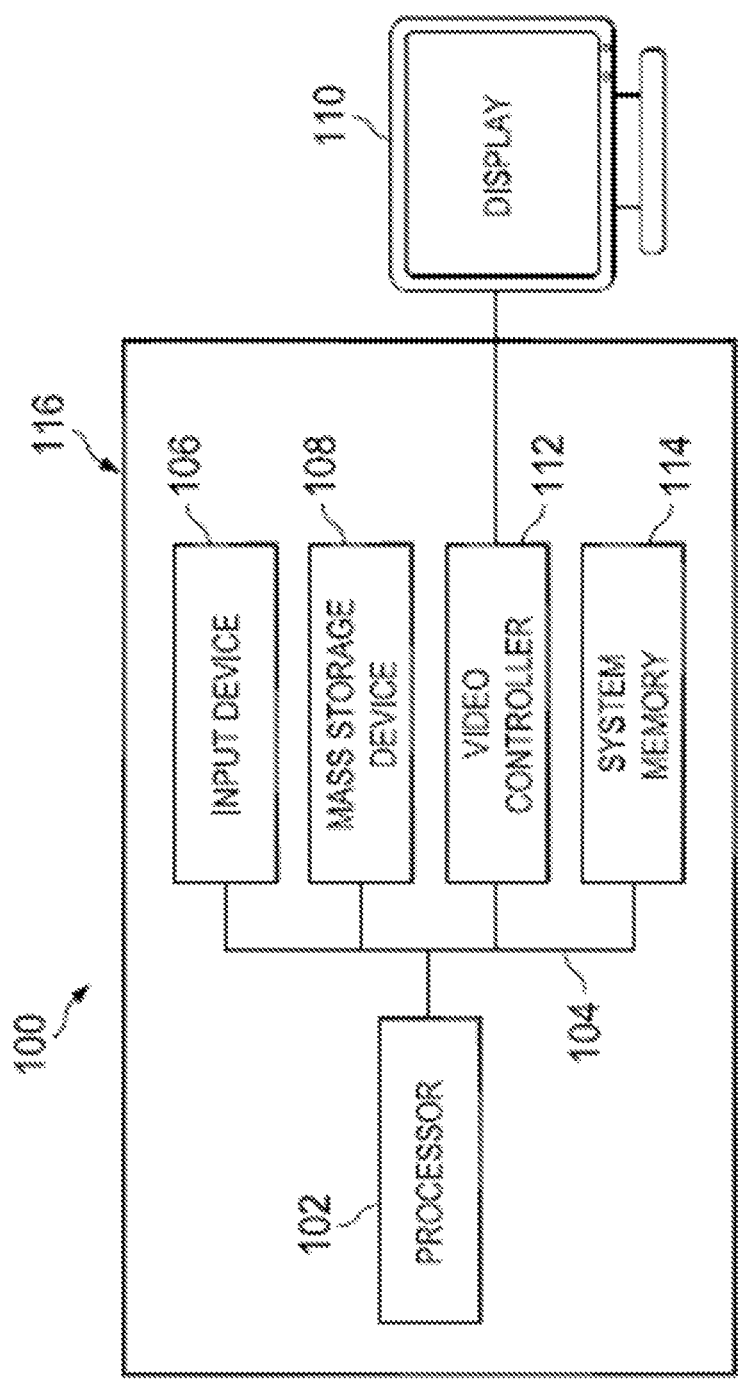
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
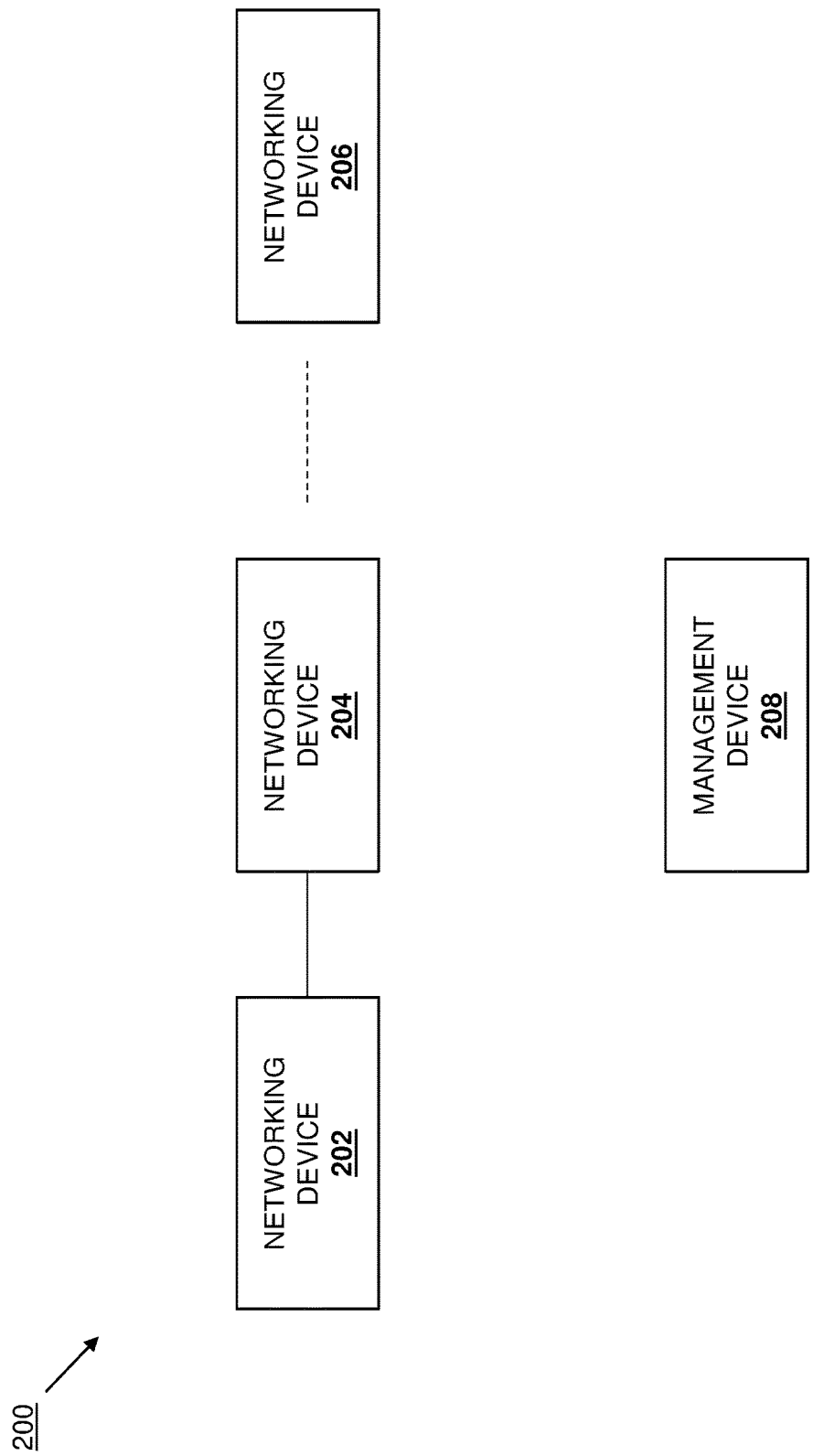
FIG. 2 is a schematic view illustrating an embodiment of a configuration replication system.

Referring now to FIG. 2, an embodiment of a configuration replication system 200 is illustrated. While the configuration replication system 200 is described below as a port configuration replication system that operates to replicate port configurations across different ports and/or ports on different networking devices, one of skill in the art in possession of the present disclosure will recognize that other configurations for other types of systems and/or subsystems may benefit from the teachings of the present disclosure and thus will fall within its scope. In the illustrated embodiment, the configuration replication system 200 includes a plurality of networking devices 202, 204, and up to 206. In an embodiment, any or all of the networking devices 202-206 may be the IHS 100 discussed below and/or may include some or all of the components of the IHS 100. For example, any or all of the networking devices 202-206 may be switches, routers, access points, and/or other networking devices known in the art. However, as discussed above, other devices that includes ports (e.g., servers, storage systems, etc.), as well as other configurable systems and/or subsystems, may replace the networking devices 202-206 while remaining within the scope of the present disclosure. As illustrated, each of the networking devices 202-206 may be coupled to each other by one or more links. However, in other embodiments, the configuration replication system 200 may include devices that are not coupled together. For example, configurations such as the port configurations discussed below may be replicated for ports on different networking devices that are not coupled together (i.e., networking devices that are provided in different networks (e.g., different Local Area Networks (LANs)) and that do not include inter-device connections).

The configuration replication system 200 also includes a management device 208. In an embodiment, the management device 208 may be the IHS 100 discussed below and/or may include some or all of the components of the IHS 100. For example, the management device may be provided by a desktop computer, laptop/notebook computer, a tablet computer, a mobile phone, a server, and/or other management devices known in the art. As illustrated and discussed below, in some embodiments, the management device 208 may couple to any or all of the networking devices 202-206 directly (e.g., one-at-a-time via a local wired connection to a management port on that networking device, via a local wireless connection, etc.), while in other embodiments, the management device 208 may couple to any or all of the networking devices 202-206 via a network (e.g., concurrently.) While a specific example of the configuration replication system 200 has been illustrated and described, one of skill in the art in possession of the present disclosure will recognize that a wide variety of modification to the configuration replication systems described herein will fall within the scope of the present disclosure as well.

Figure 3:
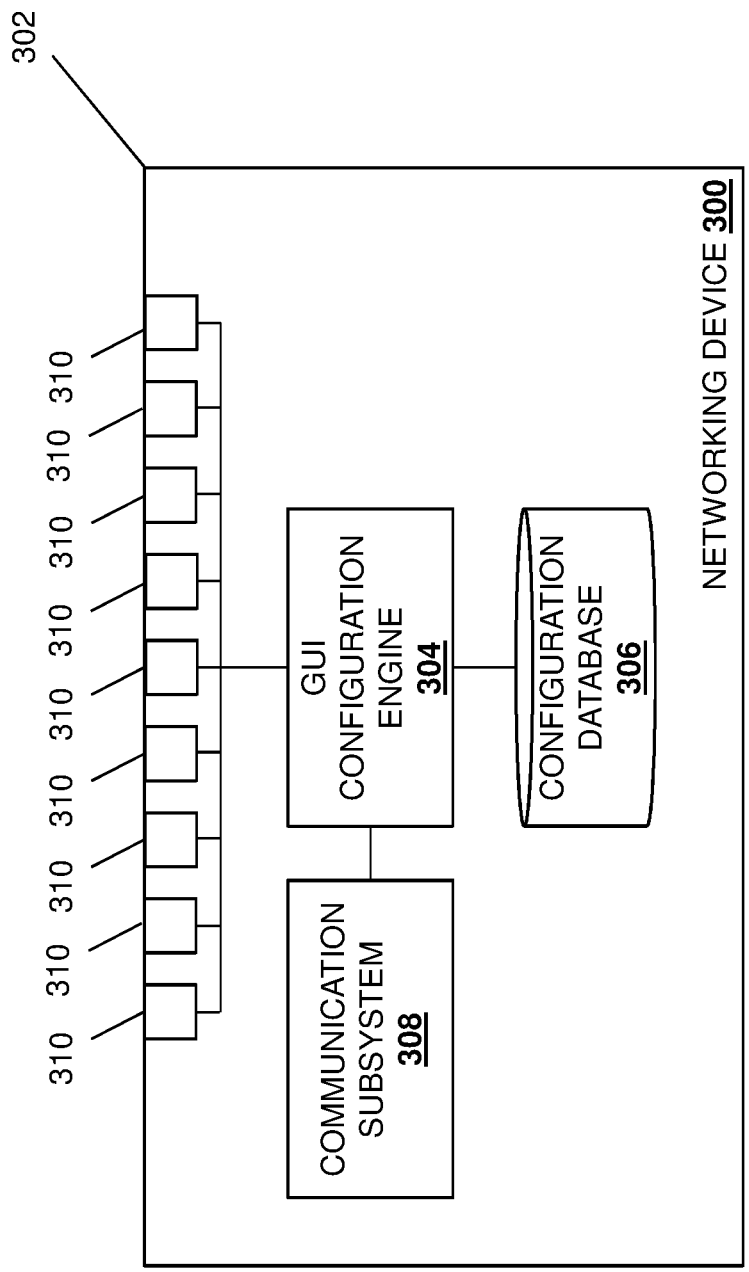
FIG. 3 is a schematic view illustrating an embodiment of a networking device used in the configuration replication system of FIG. 2.

Referring now to FIG. 3, an embodiment of a networking device 300 is illustrated that may provide any or all of the networking devices 202-206 discussed above with reference to FIG. 2. As such, the networking device 300 may be the IHS 100 discussed below and/or may include some or all of the components of the IHS 100, and in specific embodiments may be provided by a switch, router, access point, and/or other networking device known in the art. In the illustrated embodiment, the networking device 300 includes a chassis 302 that houses the components of the networking device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a Graphical User Interface (GUI) configuration engine 304 that is configured to perform the functions of the GUI configuration engines 304 and the networking devices 300 discussed above.

In some embodiments, the networking device 300 may be provided such that it only supports configuration via a GUI configuration subsystem, rather than via a Command Link Interface (CLI) configuration subsystem that one of skill in the art will recognize is provided in many conventional switches. For example, the networking device 300 may be provided for customers that are not skilled or otherwise comfortable using a CLI configuration subsystem to configure those networking devices, and thus the networking device 300 may be provided without the CLI configuration subsystem (thus reducing its cost) in favor of the GUI configuration subsystem. As such, in some embodiments, the GUI configuration engine 304 may provide such a GUI configuration subsystem. However, in other embodiments, the GUI configuration engine/GUI configuration subsystem may be provided in a networking device that also includes a CLI configuration subsystem while remaining within the scope of the present disclosure. Furthermore, one of skill in the art in possession of the present disclosure will recognize that, at least in some cases, the teachings of the present disclosure may be extended to CLI configuration subsystems while remaining within the scope of the present disclosure.

The chassis 302 may also house a storage system (not illustrated, but which may include the storage device 108 discussed above with reference to FIG. 1) that is coupled to the GUI configuration engine 304 (e.g., via a coupling between the storage system and the processing system) and that includes a configuration database 306 that is configured to store the configurations discussed below. For example, the storage system may include one or more memory subsystems that are configured to store a startup configuration, a running configuration, and/or other configurations known in the art. The chassis 302 may also house a communication subsystem 308 that is coupled to the GUI configuration engine 304 (e.g., via a coupling between the communication subsystem 308 and the processing system) and that may include a Network Interface Controller (NIC), a wireless communication subsystem (e.g., a Bluetooth® wireless communication subsystem), and/or a variety of other communication subsystems known in the art. The chassis 302 may also house a plurality of ports 310 that are coupled to the GUI configuration engine 304 (e.g., via coupling(s) between the ports 310 and the processing system). As discussed below, in some embodiments, each of the ports 310 may be associated with a respective port configuration that may be stored in the configuration database 306 (e.g., as part of a running configuration). While the communication subsystem 308 is illustrated as being coupled to the ports 310 via the GUI configuration engine 304 (e.g., via the processing system), in some embodiments the communication subsystem 308 may be coupled directly to the ports 310 while remaining within the scope of the present disclosure. While a specific example of networking device 300 has been illustrated and described, one of skill in the art in possession of the present disclosure will recognize that the networking device 300 may include other components that perform conventional networking device functionality, as well as the functionality discussed below, while remaining within the scope of the present disclosure.

Figure 4:
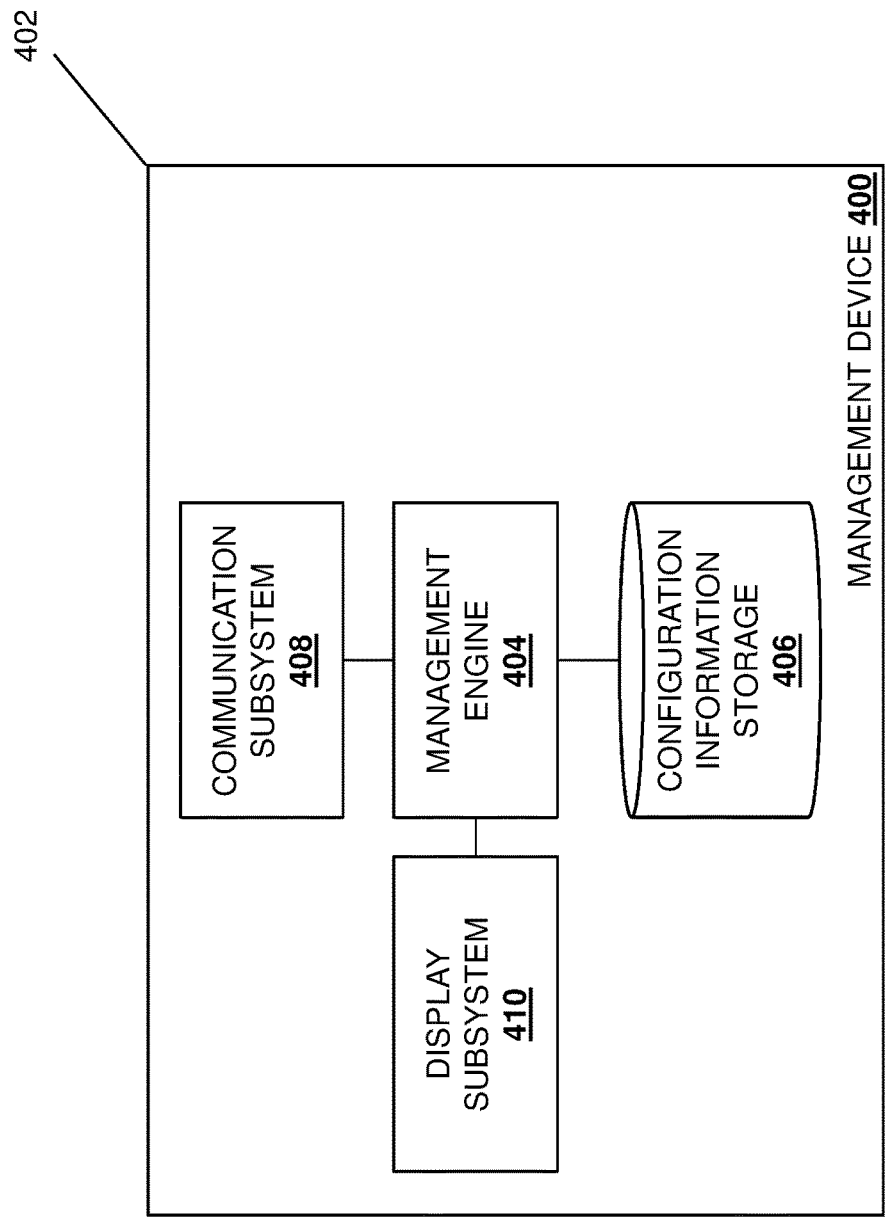
FIG. 4 is a schematic view illustrating an embodiment of a management device used in the configuration replication system of FIG. 2.

Referring now to FIG. 4, an embodiment of a management device 400 is illustrated that may provide the management device 400 discussed above with reference to FIG. 2. As such, the management device 400 may be the IHS 100 discussed below and/or may include some or all of the components of the IHS 100, and in specific embodiments may be provided by a desktop computer, a laptop/notebook computer, a tablet computer, a mobile phone, and/or other management device known in the art. In the illustrated embodiment, the management device 400 includes a chassis 402 that houses the components of the management device 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a management engine 404 that is configured to perform the functions of the management engines 404 and the management devices 400 discussed above.

The chassis 402 may also house a storage system (not illustrated, but which may include the storage device 108 discussed above with reference to FIG. 1) that is coupled to the management engine 404 (e.g., via a coupling between the storage system and the processing system) and that includes a configuration information storage 406 that is configured to store the configuration information discussed below. In an embodiment, the storage system may include one or more memory subsystems that provide a temporary storage area or data buffer for data to be replicated. For example, the configuration information storage 406 may be provided by a "clipboard" software facility used for short-term data storage and/or data transfer between documents and applications via cut-and-paste operations. However, while the use of such a clipboard is discussed in detail below, other temporary data storage facilities may be utilized with, or in place of, the clipboard for temporary data storage, and longer term storage of the configuration information discussed below may fall within the scope of the present disclosure as well.

The chassis 402 may also house a communication subsystem 408 that is coupled to the management engine 404 (e.g., via a coupling between the communication subsystem 408 and the processing system) and that may include a Network Interface Controller (NIC), a wireless communication subsystem (e.g., a Bluetooth® wireless communication subsystem), and/or a variety of other communication subsystems known in the art. The chassis 402 may also house (or be coupled to) a display subsystem 410 that is coupled to the management engine 404 (e.g., via a coupling between the display subsystem 410 and the processing system), and that is configured to display the networking device GUIs discussed below. While a specific example of management device 400 has been illustrated and described, one of skill in the art in possession of the present disclosure will recognize that the management device may include other components that perform conventional management device functionality, as well as the functionality discussed below, while remaining within the scope of the present disclosure.

Figure 5:
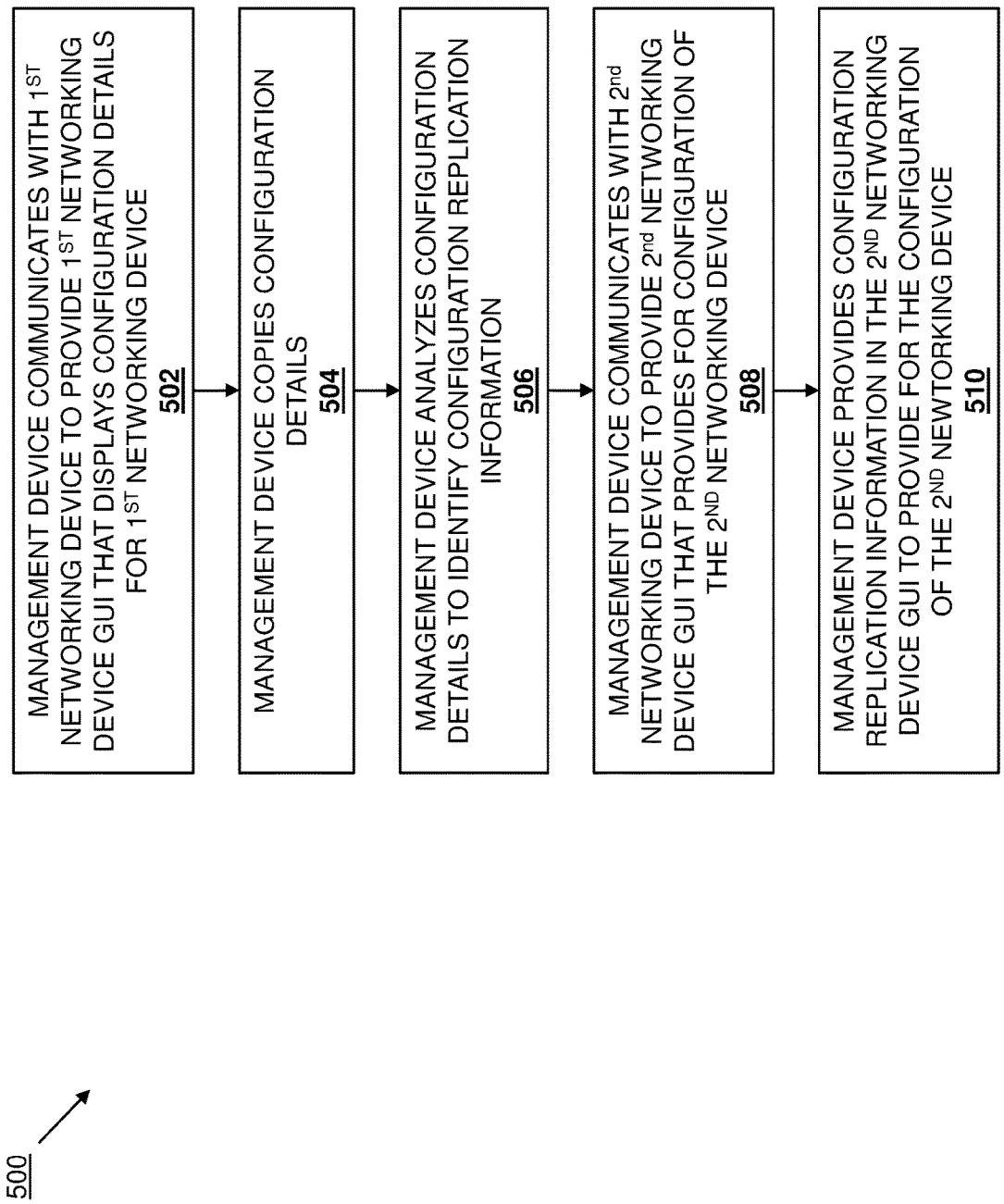
FIG. 5 is a flow chart illustrating a method for replicating configurations.

Referring now to FIG. 5, an embodiment of a method 500 for replicating configurations is illustrated. As discussed below, in some embodiments, the systems and methods of the present disclosure provide for port configuration replication by copying port configuration details, which are displayed on a first networking device configuration GUI for a first networking device, to a clipboard. Those port configuration details are then analyzed to identify port configuration replication information, and that port configuration replication information may then be pasted from the clipboard to fields in a second networking device configuration GUI for a second networking device in order to replicate a port configuration of a port on the first networking device to a port on the second networking device. As such, a port configuration for a networking device may be replicated without the need to copy the running configuration from that networking device, and thus without the need for a telnet connection and/or other connection through a serial port, which are necessary in conventional systems in order to read a running configuration of the networking device. The systems and methods of the present disclosure also negate the need to scan for port configuration information for a specific port each time that port configuration information is to be used to configure a port, and the replication of port configurations in the manner described herein may operate across separate browser sessions, while also providing for the replication of any particular port configuration on multiple different ports at once.

Figure 6:
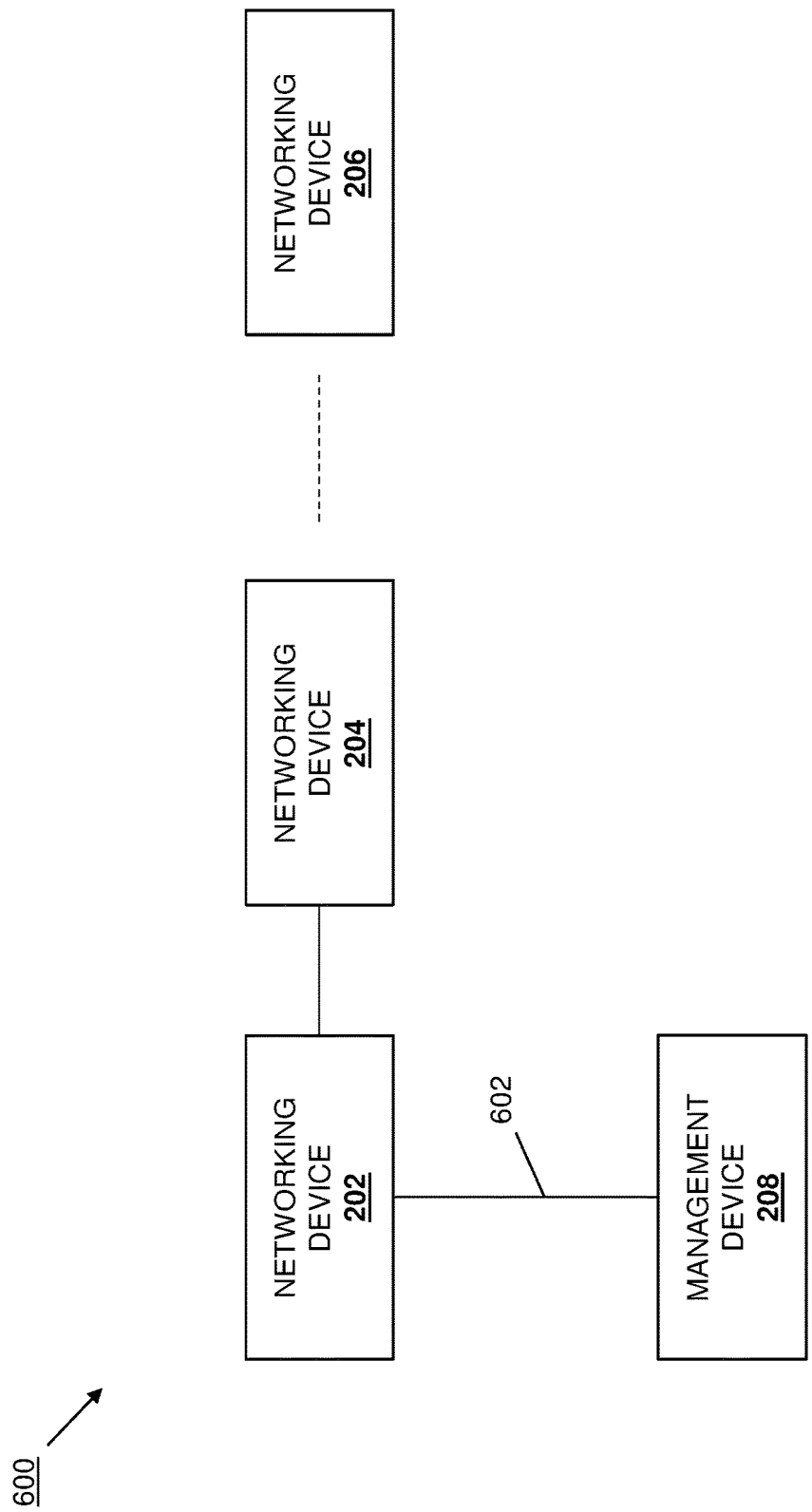
FIG. 6 is a schematic view illustrating an embodiment of a management device connected to a first networking device in the configuration replication system of FIG. 2.
Figure 7:
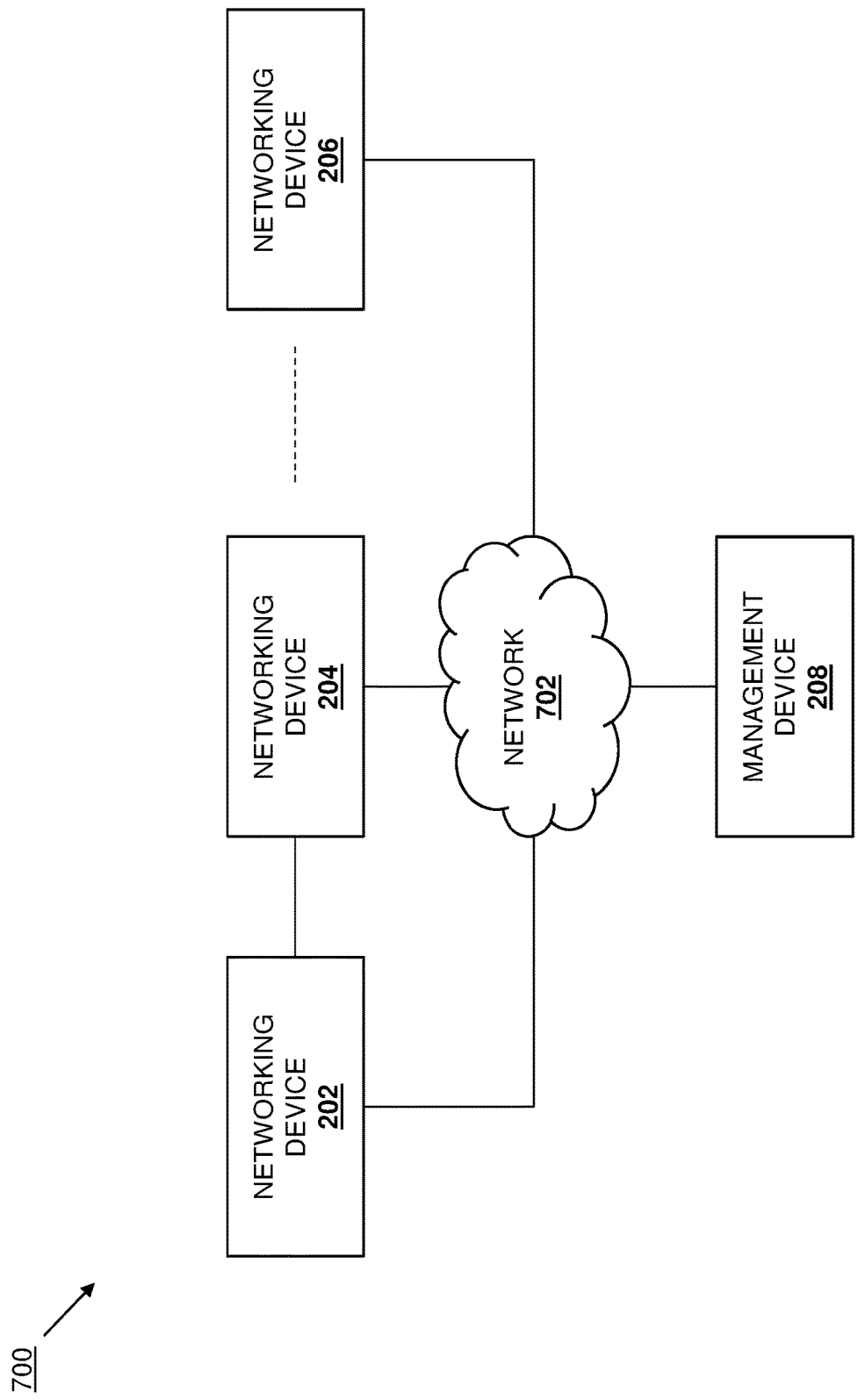
FIG. 7 is a schematic view illustrating an embodiment of a management device connected to a plurality of networking devices in the configuration replication system of FIG. 2.

The method 500 begins at block 502 where a management device communicates with a first networking device to provide a first networking device Graphical User Interface (GUI) that displays configuration details for the first networking device. In an embodiment, at or before block 502, the management device 208 may couple directly to the first networking device via a local connection. For example, FIG. 6 illustrates the configuration replication system 200 in a copying configuration 600 with the management device 208 directly coupled to the networking device 202 via a link 602. In a specific example, the link 602 may be a wired link provided by cabling connected to each of the communication subsystem 308 in the networking device 300 (e.g., one of the ports 310) and the communication subsystem 408 in the management device 400. In another specific example, the link 602 may be a wireless link provided between the communication subsystem 308 in the networking device 300 and the communication subsystem 408 in the management device 400. However, in another embodiment, at or before block 502, the management device 208 may couple to each of a plurality of networking devices via a network connection. For example, FIG. 7 illustrates the configuration replication system 200 in a copying configuration 700 with the management device 208 coupled to each of the networking devices 202-206 via a network 702 (e.g., a LAN, the Internet, etc.) While a few specific examples have been provided, one of skill in the art in possession of the present disclosure will recognize that the management device 208 may couple of the first networking device (i.e., any of the networking devices 202-206) at block 502 in any of a variety of manners while remaining within the scope of the present disclosure.

At block 502, the management engine 404 in the management device 208/400 may communicate with the GUI configuration engine 304 in the networking device 202/300 in order to display a networking device configuration GUI for the networking device 202/300 that includes port configuration details. For example, the management engine 404 in the in the management device 208/400 may be configured to provide a networking device configuration GUI, and may communicate with the GUI configuration engine 304 in the networking device 202/300 to cause the GUI configuration engine 304 to retrieve port configuration information from its configuration database 306 and send that port configuration information to the management engine 404 for use in providing the networking device configuration GUI that displays the port configuration details.

Figure 8:
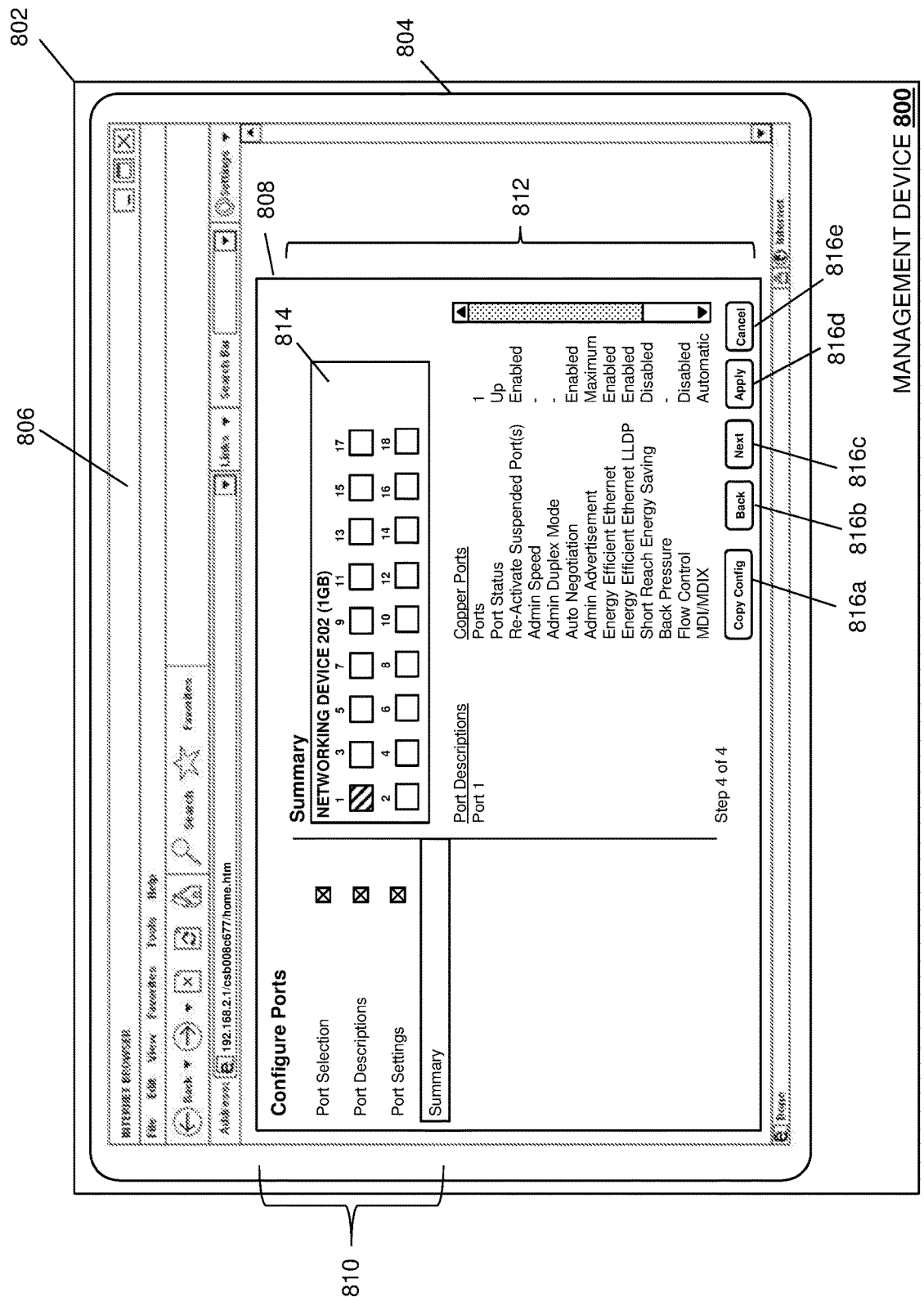
FIG. 8 is a screen shot view illustrating an embodiment of a Graphical User Interface (GUI) configuration summary screen displayed on the management device of FIG. 4.

Referring now to FIG. 8, an embodiment of a management device 800, which may be the management devices 208 and/or 400 discussed above, is illustrated that includes a chassis 802 having a display subsystem 804 displaying a first networking device configuration GUI that is providing a GUI configuration summary screen. For example, in FIG. 8 the display subsystem 804 is displaying an Internet browser 806 that is providing a GUI configuration summary screen 808 that summarizes a port configuration for one of the ports 310 on the networking device 202/300. In the illustrated embodiment, the GUI configuration summary screen 808 includes a port configuration progress section 810 that details the progress in configuring ports on the networking device 202/300. For example, the port configuration progress section 810 includes a port selection task (along with an indication that the port selection task is current completed), a port description task (along with an indication that the port description task is currently completed), a port setting task (along with an indication that the port setting task is currently completed), and a port summary task (along with an indication that the port summary task is currently being performed).

In the illustrated embodiment, the GUI configuration summary screen 808 also includes a port configuration summary section 812 that includes a networking device graphic 814 along with that details the configuration of a port indicated by the networking device graphic 814. For example, networking device graphic 814 includes an indication that the GUI configuration summary screen 808 is being provided for the networking device 202 (e.g., "NETWORKING DEVICE 202 (1 GB)"), as well as graphical elements for each of the ports 310 on the networking device 202/300 (e.g., 18 different ports on the networking device 202/300). In the illustrated embodiment, a graphical element for one of the ports 310 on the networking device 202/300 is indicated as having been selected (e.g., by the cross-hatching on port "1" in the networking device graphic 814), and the port configuration summary section 812 is displaying port configuration details for that selected port. As discussed above, in some embodiments, the port configuration details in the port configuration summary section 812 may be provided by the management engine 404 using port configuration information retrieved from the networking device 202/300. However, in other embodiments, the port configuration details in the port configuration summary section 812 may have been provided to the management engine 404 via port configuration information entered into the management device 800 during the port settings task (e.g., the port configuration information associated with the displayed port configuration details may not yet have been applied and/or added to the running configuration of the networking device 202).

In the illustrated example, the port configuration details for the selected port (e.g., port 1 in the networking device graphic 814) include a port description (e.g., "Port 1" in this example), a number of ports (e.g. "1" in this example), a port status (e.g., "up" in this example), an indication of a status of re-activating suspending port(s) (e.g., "enabled" in this example), an admin speed (e.g., unspecified in this example), an admin duplex mode (e.g., unspecified in this example), a level of admin advertisement (e.g., "maximum" in this example), an indication of a status of energy efficient Ethernet (e.g., "enabled" in this example), an indication of a status of energy efficient Ethernet Link Layer Discovery Protocol (LLDP) (e.g., "enabled" in this example), an indication of short reach energy saving (e.g., "disabled" in this example), an indication of back pressure (e.g., unspecified in this example), an indication of flow control (e.g., "disabled" in this example), and an indication of Medium Dependent Interface (MDI)/MDI crossover (MDIX) (e.g., "automatic" in this example.) While specific port configuration details have been provided, one of skill in the art in possession of the present disclosure will recognize that port configuration details may include many more details and/or different details than are illustrated in FIG. 8 while remaining within the scope of the present disclosure.

In addition, the GUI configuration summary screen 808 includes a copy configuration button 816a (discussed in further detail below), a back button 816b (e.g., for directing the networking device configuration GUI back to the port settings task, port descriptions task, and/or port selection task, discussed above), a next button 816c (e.g., for directing the networking device configuration GUI forward), an apply button 816d (e.g., for applying the port configuration), and a cancel button 816d (e.g., for cancelling the port configuration). While examples of the uses of the buttons 816a-e are provided, one of skill in the art in possession of the present disclosure will recognize how the buttons 816a-e may be utilized to manipulate the networking device configuration GUI to provide for a variety of actions that will enable the functionality discussed below.

In the illustrated embodiment, the user of the management device 208/400/800 may have provided the port configuration information that is displayed in the port configuration details on the GUI configuration summary screen 808 by, for example, providing such port configuration information during a port settings task (discussed above) using the networking device configuration GUI for the networking device 202. In one example, the user of the management device 208/400/800 may have provided that port configuration information during the port settings task using the networking device configuration GUI for the networking device 202, selected a next button (e.g., similar to the next button 816c discussed above), and then been presented with the GUI configuration summary screen 808 (e.g., without applying that port configuration to the selected port.) However, in another example, the user of the management device 208/400/800 may provide port configuration information during a port settings task using the networking device configuration GUI for the networking device 202, select an apply button (e.g., similar to the apply button 816d discussed above) to apply that port configuration to the selected port, and then be presented with a GUI configuration summary screen similar to the GUI configuration summary screen 808.

In another embodiment, the user of the management device 208/400/800 may have provided the port configuration information that is displayed in the port configuration details on the GUI configuration summary screen 808 previously (e.g., in a previous configuration and/or browser session), and then may use the networking device configuration GUI for the networking device 202 to view those port configuration details (e.g., in a subsequent configuration and/or browser session.) In one example, the user of the management device 208/400/800 may simply use the networking device configuration GUI for the networking device 202 to access the GUI configuration summary screen 808 to view a configuration of a port (e.g., by selecting that port), and then may be presented with a GUI configuration summary screen that is similar to the GUI configuration summary screen 808. Thus, the GUI configuration summary screen 808 may provide for the viewing of port configuration details at block 502 for previously provided port configuration information (e.g., provided during a previous networking device configuration session), for currently provided port configuration information that has been applied to a running configuration of the networking device, for currently provided port configuration information that has not yet been applied to the running configuration of the networking device, and/or for a variety of other port configuration scenarios that would be apparent to one of skill in the art in possession of the present disclosure.

The method 500 the proceeds to block 504 where the management device copies the configuration details. In an embodiment, at block 504, the management engine 404 in the management device 208/400/800 may operate to copy the port configuration details displayed on the GUI configuration summary screen 808. For example, at block 504, the user of the management device 208/400/800 may select the copy configuration button 816a and, in response, the management engine 404 may operate to copy the port configuration details included in the port configuration summary section 812 of the GUI configuration summary screen 808 to the configuration information storage 406 in the management device 208/400/800. In a specific example, at block 504, the management engine 404 may perform a copy operation on any data displayed in the port configuration summary section 812 of the GUI configuration summary screen 808 such that that data is written to a clipboard provided by the configuration information storage 406. Using the example illustrated in FIG. 8, such a copy operation to the clipboard at block 504 may result in the clipboard including the following port configuration details:

| | |
|---|---|
| Summary | |
| Port Descriptions | |
| Port 1 | |
| Copper Ports | |
| Ports | 1 |
| Port Status | Up |
| Re-Activate Suspended Port(s) | Enabled |
| Admin Speed | — |
| Admin Duplex Mode | — |
| Auto Negotiation | Enabled |
| Admin Advertisement | Maximum |
| Energy Efficient Ethernet | Enabled |
| Energy Efficient Ethernet LLDP | Enabled |
| Short Reach Energy Saving | Disabled |
| Back Pressure | — |
| Flow Control | Disabled |
| MDI/MDIX | Automatic |

As such, one of skill in the art in possession of the present disclosure will recognize that the copy operation performed at block 504 may result in the copying of all text information in the port configuration summary section 812 (e.g., but not the networking device graphic 814 or any of its elements.) However, while a specific copying operation is illustrated and described herein, one of skill in the art in possession of the present disclosure will recognize that other copying techniques may be utilized to capture the port configuration details displayed in the port configuration summary section 812 while remaining within the scope of the present disclosure. For example, the copy operation may simply copy any text information displayed on the GUI configuration summary screen 808, or may copy a more focused subset of the text information displayed on the GUI configuration summary screen 808 (e.g., ignoring the unspecified fields discussed above and illustrated by dashes ("-") in FIG. 8), while remaining within the scope of the present disclosure. In an embodiment, the copying of the port configuration detail may provide those port configuration details as a text file. As such, the port configuration details displayed in the port configuration summary section 812 may be cut directly from the display of those port configuration details, and pasted to an internal buffer provided in the management device 800 (which may be associated with a target networking device, discussed in further detail below).

The method 500 the proceeds to block 506 where the management device analyzes the configuration details to identify configuration replication information. In an embodiment, at block 506, the management engine 404 may operate to analyze the port configuration details that were copied at block 504 in order to identify port configuration replication information. For example, at block 506 the management engine 404 in the management device 208/400/800 may operate to parse a text file that includes the port configuration details, recognize port configuration categories in the text file, and identify respective port configuration information that is associated in the text file with each port configuration category.

Using the example of the copied port configuration details that is provided above, at block 506 the management engine 404 may recognize "Port Status" as a port configuration category and "Up" as its associated port configuration information, "Re-Activate Suspended Port(s)" as a port configuration category and "Enabled" as its associated port configuration information, "Admin Speed" as a port configuration category and "-" as its associated port configuration information, "Admin Duplex Mode" as a port configuration category and "-" as its associated port configuration information, "Auto Negotiation" as a port configuration category and "-" as its associated port configuration information, "Admin Speed" as a port configuration category and "Enabled" as its associated port configuration information, "Admin Advertisement" as a port configuration category and "Maximum" as its associated port configuration information, "Energy Efficient Ethernet" as a port configuration category and "Enabled" as its associated port configuration information, "Energy Efficient Ethernet LLDP" as a port configuration category and "Enabled" as its associated port configuration information, "Short Reach Energy Saving" as a port configuration category and "Enabled" as its associated port configuration information, "Back Pressure" as a port configuration category and "-" as its associated port configuration information, "Flow Control" as a port configuration category and "Disabled" as its associated port configuration information, and "MDI/MDIX" as a port configuration category and "Automatic" as its associated port configuration information.

In some embodiments, at block 506, the identification of the port configuration replication information may include discarding, deleting, and/or otherwise disregarding information in the port configuration details that is not determined to be port configuration replication information or is otherwise determined to be not relevant to replicating port configurations. In one example, the management engine 404 may remove some of the port configuration details from the text file (to which the port configuration details were copied) such that only port configuration replication information and/or information that is relevant to replicating port configurations remains in that text file. In another example, the management engine 404 may create a new text file that includes only port configuration replication information and/or information that is relevant to replicating port configurations and that was recognized in the port configuration details. In yet another example, the management engine 404 may simply mark or otherwise note in the text file of the port configuration details the location of port configuration replication information and/or information that is relevant to replicating port configurations.

Using the example of the copied port configuration details that is provided above, at block 506 the management engine 404 may modify the port configuration details in the text file (to which the port configuration details were copied) to include, or create a new text file that includes, the following:

| | |
|---|---|
| Port Status | Up |
| Re-Activate Suspended Port(s) | Enabled |
| Auto Negotiation | Enabled |
| Admin Advertisement | Maximum |
| Energy Efficient Ethernet | Enabled |
| Energy Efficient Ethernet LLDP | Enabled |
| Short Reach Energy Saving | Disabled |
| Flow Control | Disabled |
| MDI/MDIX | Automatic |

Thus, in the example above, the modified or new text file does not include "Summary", "Port Descriptions", "Port 1", "Copper Ports", and "Ports 1" due to, for example, the management engine 404 having determined that that information was extraneous text from the port configuration summary section 812 of the GUI configuration summary screen 808 (e.g., "Summary" and "Copper Port") or was redundant to the port replication (e.g., "Port Descriptions", "Port 1", and "Ports 1" because that information will be associated with the port configuration replication information that was not discarded). Furthermore, in the example above, the modified or new text file does not include "Admin Speed-", Admin Duplex Mode-", and "Back Pressure-" due to, for example, the management engine 404 having determined that that information included port configuration categories but no associated port configuration information (e.g., each of "Admin Speed", "Admin Duplex Mode", and "Back Pressure" are unspecified)

As such, following block 506, a text file with the port configuration replication information (e.g., the indications of whether a feature is enabled, disabled, at maximum capability, in an automatic mode, etc.) as well as information relevant to port configuration replication (e.g., the identification of the features such as port status, auto-negotiation, admin advertisement, Energy Efficient Ethernet, Energy Efficient Ethernet LLDP, Short Reach Energy Saving, Flow Control, and MDI/MDIX) may be provided in the configuration information storage (e.g., the clipboard). In some embodiments, at block 506, the management engine may reformat a text file that includes the port replication information into HyperText Markup Language (HTML). In another embodiment, the port configuration replication information in the text file may be pasted into an internal buffer in the configuration information storage, and format that port configuration replication information into HTML.

Figure 9:
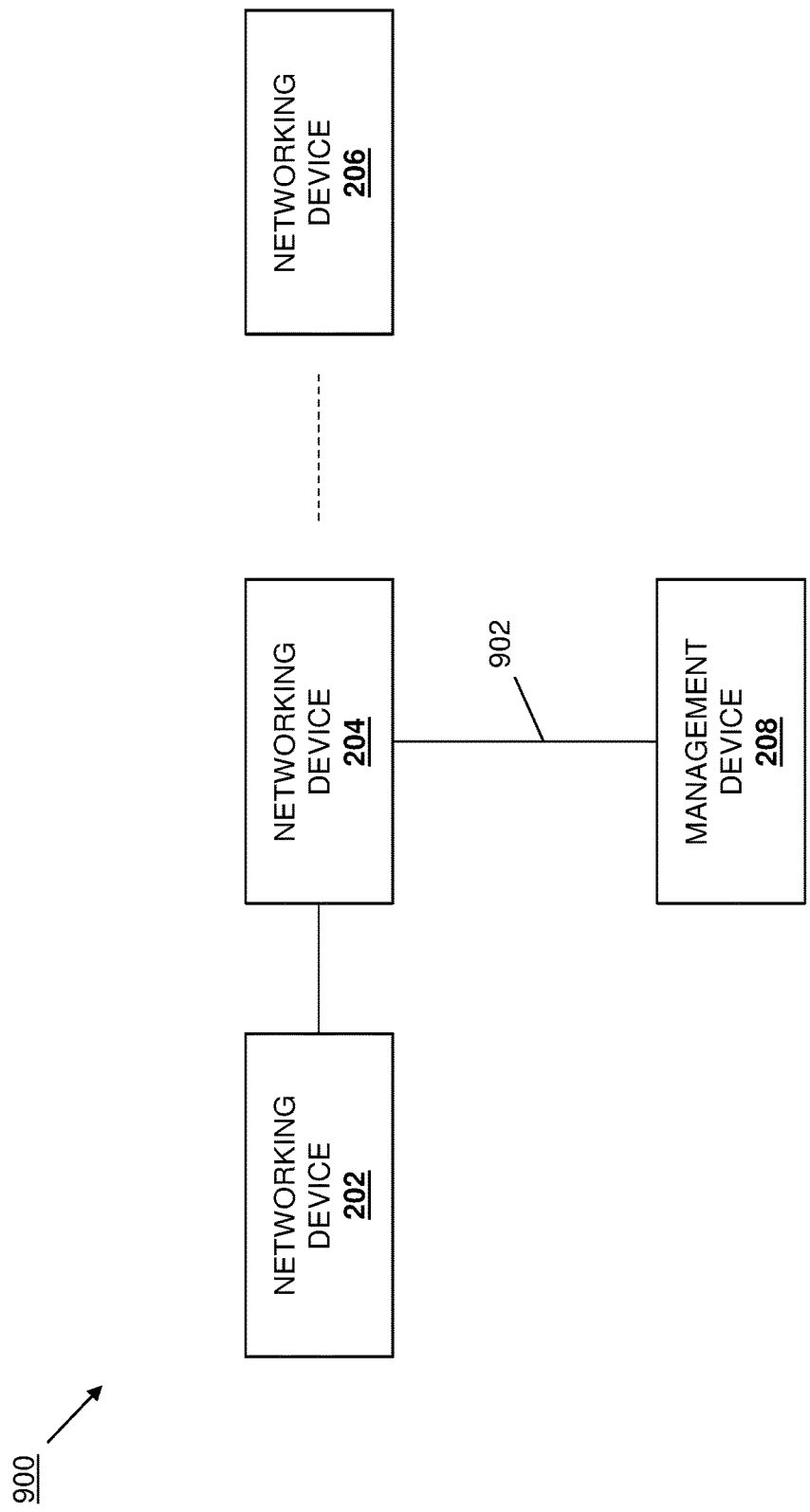
FIG. 9 is a schematic view illustrating an embodiment of a management device connected to a second networking device in the configuration replication system of FIG. 2.

The method 500 then proceeds to block 508 where the management device communicates with a second networking device to provide a second networking device GUI that displays configuration details for the second networking device. In an embodiment, at block 508, the management device 208 may couple directly to the second networking device via a local connection. For example, FIG. 9 illustrates the configuration replication system 200 in a replication configuration 900 with the management device 208 directly coupled to the networking device 204 via a link 902. In a specific example, the link 902 may be a wired link provided by cabling connected to each of the communication subsystem 308 in the networking device 300 (e.g., one of the ports 310) and the communication subsystem 408 in the management device 400. In another specific example, the link 902 may be a wireless link provided between the communication subsystem 308 in the networking device 300 and the communication subsystem 408 in the management device 400. However, as discussed above, in other embodiments, the management device 208 may couple to each of the plurality of networking devices 202-206 via the network 702 illustrated in FIG. 7. While a few specific examples have been provided, one of skill in the art in possession of the present disclosure will recognize that the management device 208 may couple of the second networking device (i.e., any of the networking devices 202-206) at block 508 in any of a variety of manners while remaining within the scope of the present disclosure.

Figure 10:
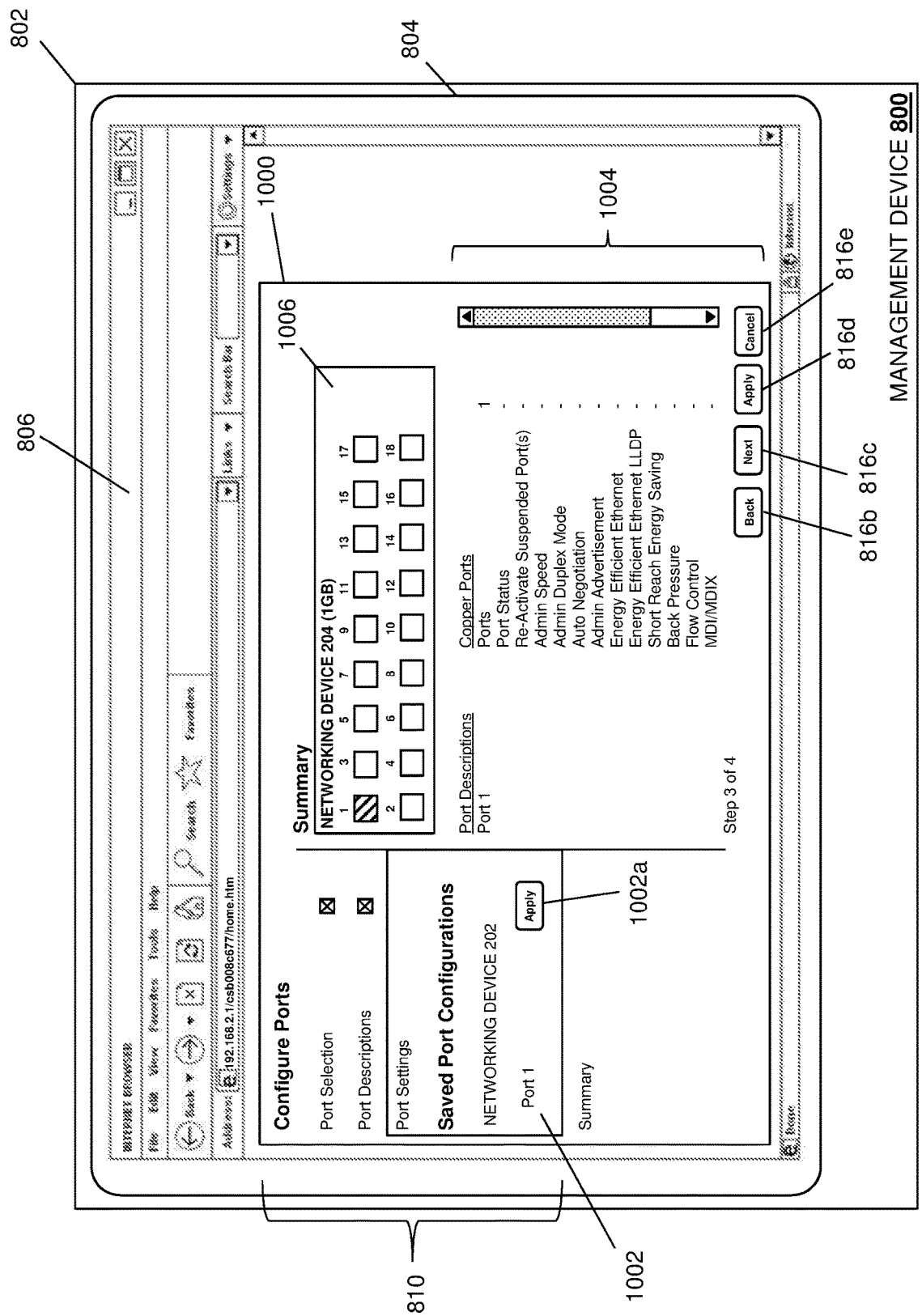
FIG. 10 is a screen shot view illustrating an embodiment of a GUI configuration application screen displayed on the management device of FIG. 4.

At block 508, the management engine 404 in the management device 208/400 may communicate with the GUI configuration engine 304 in the networking device 204/300 in order to display a networking device configuration GUI for the networking device 204/300 that provides for configuration of any of the ports 310 on the networking device 204/300. Referring now to FIG. 10, an embodiment of a management device 800 is illustrated with its display subsystem 804 displaying its Internet browser 806 that is providing a GUI configuration application screen 1000 that enables the configuration for one of the ports 310 on the networking device 204/300. In an embodiment, the Internet browser 806 may be providing the GUI configuration application screen 1000 that enables the configuration for one of the ports 310 on the networking device 204/300 in a browser session that is separate from the browser session that provided the GUI configuration copying screen 808 that enables the copying of the configuration details for one of the ports 310 on the networking device 202/300. However, the Internet browser 806 may provide the GUI configuration application screen 1000 in the same browser session as the GUI configuration copying screen 808 while remaining within the scope of the present disclosure as well.

In the illustrated embodiment, the GUI configuration application screen 1000 includes the port configuration progress section 810 discussed above that details the progress in configuring ports on the networking device 204/300. Similarly as discussed above, the port configuration progress section 810 includes a port selection task (along with an indication that the port selection task is current completed), a port description task (along with an indication that the port description task is currently completed), a port setting task (along with an indication that the port setting task is currently being performed), and a port summary task. In the illustrated embodiment, the port settings task is associated with saved port configurations that include a port configuration replication information identifier 1002 for the port configuration replication information that was saved for the port 310 on the networking device 202 (e.g., "Port 1"), along with an "apply" button 1002a.

In the illustrated embodiment, the GUI configuration application screen 1000 also includes a port configuration section 1004 having fields for providing for configuration of a port that is indicated by a networking device graphic 1004 that is similar to the networking device graphic 814 discussed above. For example, networking device graphic 1004 includes an indication that the GUI configuration application screen 1000 is being provided for the networking device 204 (e.g., "NETWORKING DEVICE 204 (1 GB)"), as well as graphical elements for each of the ports 310 on the networking device 204/300 (e.g., 18 different ports on the networking device 204/300). In the illustrated embodiment, a graphical element for one of the ports 310 on the networking device 204/300 is indicated as having been selected (e.g., by the cross-hatching on port "1" in the networking device graphic 1004), and the port configuration section 1004 provides fields for receiving port configuration information for that selected port (e.g., each including a dash ("-") to indicate that port "1" has not been configured yet.)

In the illustrated example, the port configuration fields for the selected port (e.g., port "1" in the networking device graphic 1004) include fields for a port status, an indication of a status of re-activating suspending port(s), an admin speed, an admin duplex mode, a level of admin advertisement, an indication of a status of energy efficient Ethernet, an indication of a status of energy efficient Ethernet Link Layer Discovery Protocol (LLDP), an indication of short reach energy saving, an indication of back pressure, an indication of flow control, and an indication of Medium Dependent Interface (MDI)/MDI crossover (MDIX). While specific port configuration fields have been provided, one of skill in the art in possession of the present disclosure will recognize that port configuration fields may include many more fields and/or different fields than are illustrated in FIG. 10 while remaining within the scope of the present disclosure.

In addition, the GUI configuration summary screen 808 includes the back button 816b (e.g., for directing the networking device configuration GUI back to the port descriptions task and/or port selection task), the next button 816c (e.g., for directing the networking device configuration GUI to the port summary task), the apply button 816d (e.g., for applying the port configuration), and the cancel button 816d (e.g., for cancelling the port configuration) discussed above. While examples of the uses of the buttons 816b-e are provided, one of skill in the art in possession of the present disclosure will recognize how the buttons 816b-e may be utilized to manipulate the networking device configuration GUI to provide for a variety of actions that will enable the functionality discussed below.

The method 500 the proceeds to block 510 where the management device provides the configuration replication information in the second networking device GUI to provide for the configuration of the second networking device. In an embodiment, at block 510, the management engine 404 in the management device 208/400/800 may operate to provide the port configuration replication information that was identified at block 506 in the networking device configuration GUI for the networking device 204/300. For example, in response to the user selecting the apply button 1002a associated with the port configuration replication information identifier 1002, the management engine 404 may operate to provide the port configuration replication information that was identified for the port (e.g., "Port 1") on the networking device 202 in respective fields of the port configuration section 1004.

For example, with reference to the example of the port configuration replication information that was identified as discussed above, the management engine 404 may operate to automatically provide the port configuration replication information "up" in the Port Status field, the port configuration replication information "enabled" in the Auto Negotiation field, the port configuration replication information "maximum" in the Admin Advertisement field, the port configuration replication information "enabled" in the Energy Efficient Ethernet field, the port configuration replication information "enabled" in the Energy Efficient Ethernet LLDP field, the port configuration replication information "disabled" in the Short Reach Energy Saving field, the port configuration replication information "disabled" in the Flow Control field, and the port configuration replication information "automatic" in the MDI/MDIX field.

In a specific embodiment, the port configuration replication information may be provided in the networking device configuration GUI for the networking device 204/300 by sending the HTML-formatted port configuration replication information via Hypertext Transfer Protocol (HTTP) to the networking device 204. In another embodiment, the port configuration replication information may be provided in the networking device configuration GUI for the networking device 204/300 by pasting the port configuration replication information from a text file into corresponding fields of the port configuration section 1004 on the GUI configuration application screen 1000. Following the provisioning of the port configuration replication information in the port configuration section 1004, the user may then select the apply button 816*d* in order to apply the port configuration replication information to configure the port on the networking device 204 (e.g., to provide that port configuration replication information to the running configuration of the networking device 204.) However, in other embodiments, the selection of the the apply button 1002*a* associated with the port configuration replication information identifier 1002 may cause associated port configuration replication information to be automatically applied to the running configuration of the networking device 204.

One of skill in the art in possession of the present disclosure will recognize that the use of the clipboard and/or other techniques discussed above allows for the retention of the port configuration replication information across different browser session such that the copying of the port configuration details and the provisioning of the port configuration replication information may be performed in different browser sessions. Furthermore, the port configuration replication information and/or metadata associated with the port configuration replication information may be associated with the networking device GUI application and stored until that networking device GUI application is cleared (i.e., shut down without saving). Further still, one of skill in the art in possession of the present disclosure will recognize how the replication of configurations across different networking devices according to the teachings of the present disclosure does not require inter-device connections. As such, the port configuration provided as illustrated in the port configuration summary section 812 of the GUI configuration summary screen 808 may be quickly and easily provided in fields of the port configuration section 1004 on the GUI configuration application screen 1000 of different networking device configuration GUIs at different times.

While the example above illustrates a GUI configuration summary screen 808 that summarizes port configuration details in the same format as port configuration information is requested in a GUI configuration application screen 1000 for the configuration of a port, some embodiments of the present disclosure will allow for the copying of port configuration details from a GUI that summarizes those port configuration details in a different format than a GUI through which the port configuration information is provided to configure a port. In some embodiments, the configuration information storage 406 in the management device 400 may provide a superset format for port configuration replication information that is recognized from port configuration details that are copied as discussed above, and the management engine 404 may be configured to provide port configuration replication information that is recognized in those port configuration details into the superset format.

For example, following the recognition of port configuration categories and their respective port configuration replication information in the port configuration details discussed above, the management engine 404 may match the recognized port configuration categories in the port configuration details to superset format categories in the superset format, and then provide the respective port configuration replication information for each recognized port configuration category into its matching superset format category in the superset format. Then, when providing the port configuration replication information to configure a port, the management engine 404 may match the superset format categories in the superset format to the port configuration categories in the GUI configuration application screen, and then provide the respective port configuration replication information in each superset format category in the superset format in its matching field for the port configuration category in the GUI configuration application screen. However, while an example of copying port configuration details and providing port configuration replication information via GUIs that utilize differing information presentation/provisioning formats has been provided, one of skill in the art in possession of the present disclosure will recognize that other techniques for identifying and providing port configuration replication information across different networking device configuration GUIs will fall within the scope of the present disclosure as well.

Furthermore, while the example above illustrates the replication of a port configuration from a port on a first switch (i.e., the networking device 202) to a port on a second, different switch (i.e., the networking device 204), one of skill in the art will recognize that a port configuration may be replicated across ports on the same switch while remaining within the scope of the present disclosure. For example, one of skill in the art in possession of the present disclosure will recognize how the port configuration details copied from "Port 1" on the networking device 202 may be used to identify port configuration replication information substantially as discussed above, and then that port configuration replication information may be provided to configure any or all of "Port 2"-"Port 18" on the networking device 202 while remaining within the scope of the present disclosure.

Figure 11:
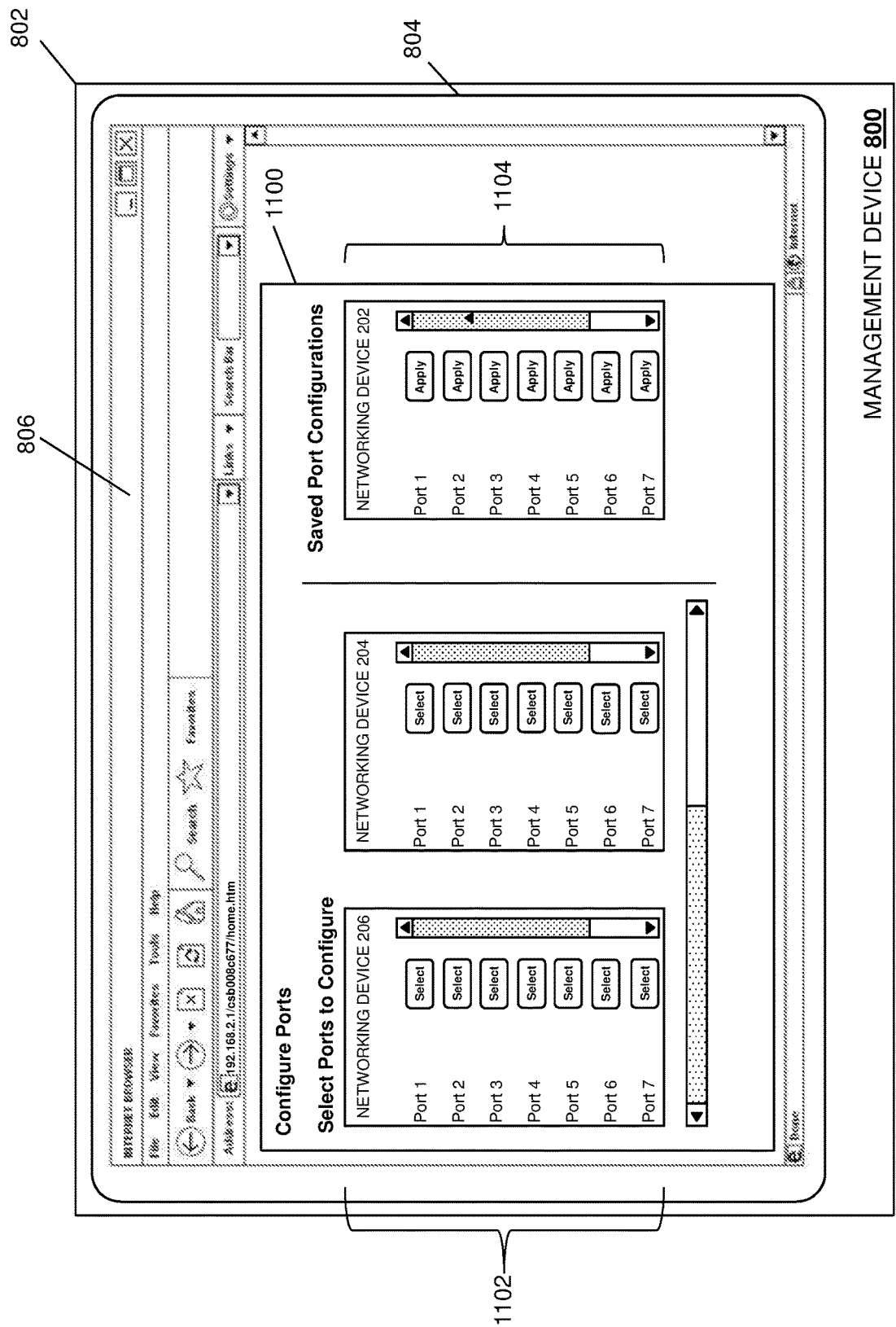
FIG. 11 is a screen shot view illustrating an embodiment of a GUI configuration application screen displayed on the management device of FIG. 4.

Further still, port configuration replication information for a port may be provided for more than one port on one or more networking devices while remaining within the scope of the present disclosure as well. Referring now to FIG. 11, an embodiment of the management device 800 is illustrated with its display subsystem 804 displaying its Internet browser 806 that is providing a GUI configuration application screen 1100 that enables the configuration from a port to be provided for multiple different ports on multiple different networking devices. In the illustrated embodiment, the GUI configuration application screen 1100 includes a port configuration select section 1102 that, in the illustrated embodiment, includes a graphical element for the networking device 204 along with respective select buttons for each of its ports, and a graphical element for the networking device 206 along with respective select buttons for each of its ports. The GUI configuration application screen 1100 also includes a port configuration apply section 1102 that, in the illustrated embodiment, includes a graphical element for the networking device 202 along with respective apply buttons for each of its ports (e.g., the configuration of each of the ports on the networking device 202 illustrated in FIG. 11 may have been identified as port configuration replication information substantially as described above). In an embodiment, the user of the management device 800 may use the GUI configuration application screen 1100 to select ports on the networking devices 204 and 206 for configuration by selecting their associated select buttons (which may result in the GUI configuration application screen 1100 providing some indication (e.g., a checkmark) that the port has been selected), and then may apply the port configuration replication information identified from any of the ports on the networking device 202 by selecting its associated apply button in order to apply its port configuration replication information to the selected ports on the networking devices 204 and/or 206. In such embodiments, the management engine 404 may access (e.g., in the background) the GUI configuration application screen for each port that is receiving a configuration, and provide port configuration replication information in the fields of the respective port configuration section for that port in order to configure each of the ports in substantially the same manner discussed above. As such, a single port configuration may be replicated on multiple different ports at the same time.

Figure 12A:
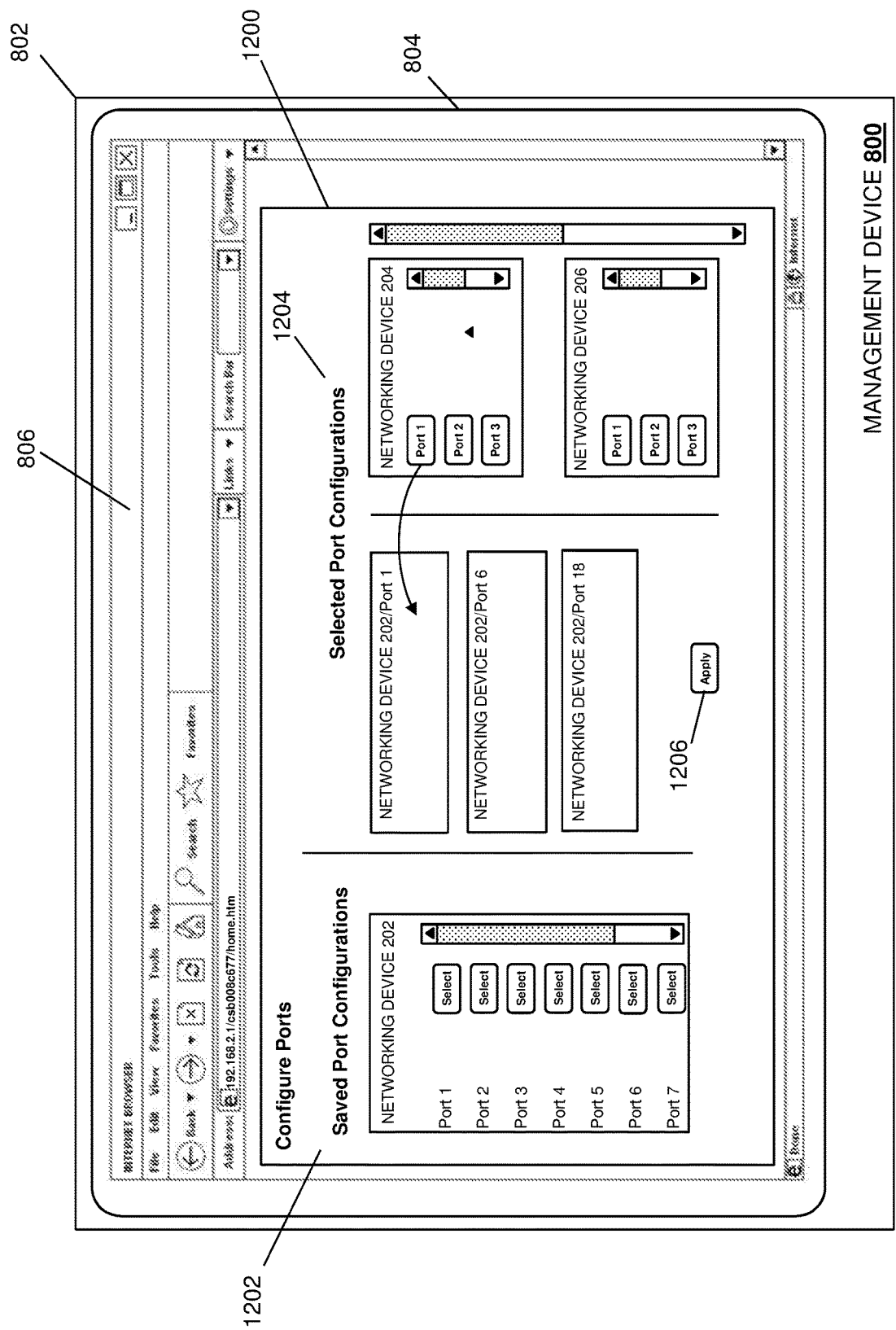
FIG. 12a is a screen shot view illustrating an embodiment of a GUI configuration application screen displayed on the management device of FIG. 4.
Figure 12B:
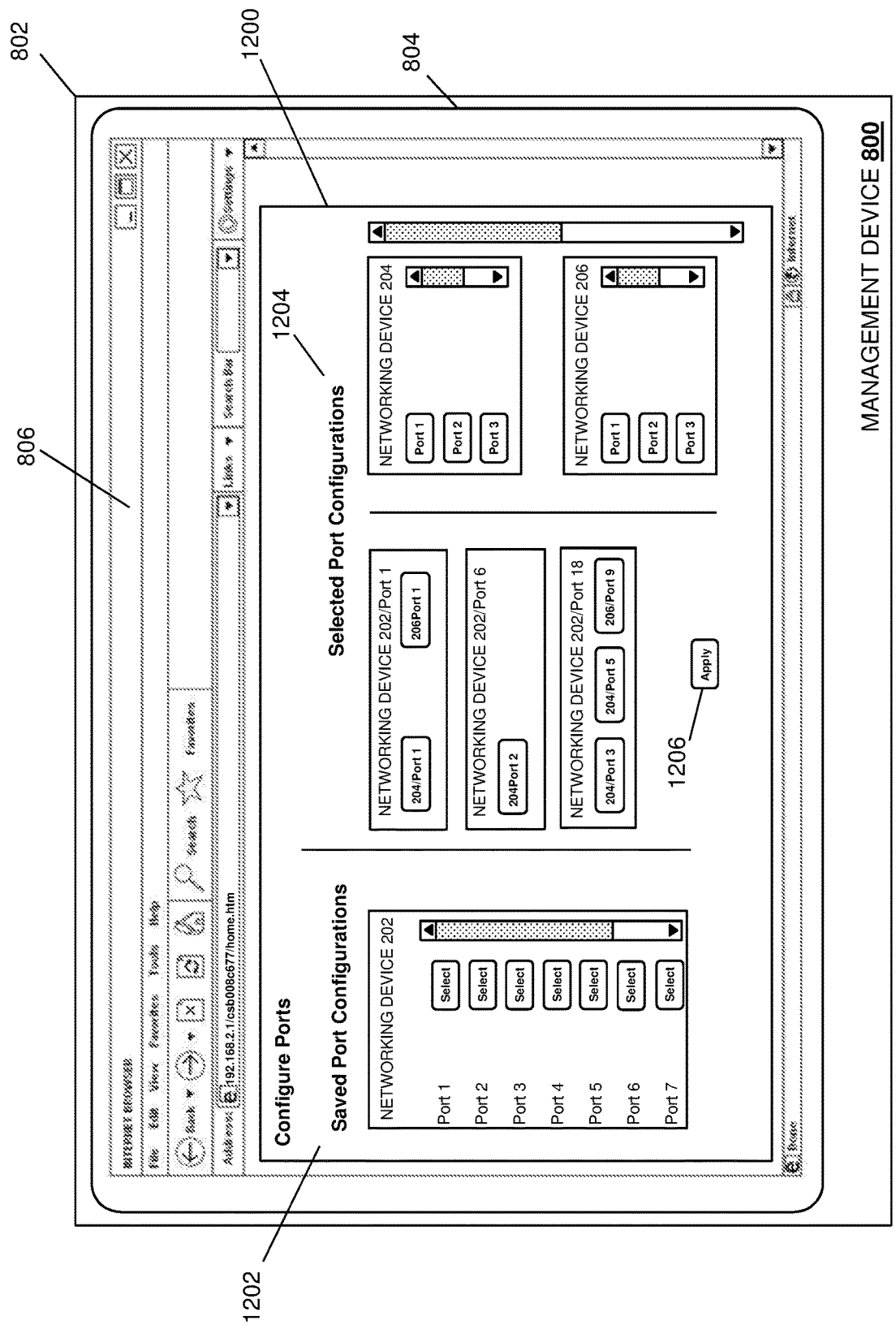
FIG. 12b is a screen shot view illustrating an embodiment of a GUI configuration application screen displayed on the management device of FIG. 4.

Yet further still, port configuration replication information for more than one port may be provided for more than one port on one or more networking devices while remaining within the scope of the present disclosure as well. Referring now to FIG. 12a, an embodiment of the management device 800 is illustrated with its display subsystem 804 displaying its Internet browser 806 that is providing a GUI configuration application screen 1200 that enables the configuration from multiple different ports to be provided for multiple different ports on multiple different networking devices. In the illustrated embodiment, the GUI configuration application screen 1200 includes a saved port configurations section 1202 that, in the illustrated embodiment, includes a graphical element for the networking device 202 along with respective select buttons for each of its ports (e.g., the configuration of each of the ports on the networking device 202 illustrated in FIG. 11 may have been identified as port configuration replication information substantially as described above). For example, the user of the management device 800 may use the GUI configuration application screen 1200 to select the port configuration replication information for multiple ports on the networking device 202 by selecting the associated select buttons for those ports, and that selection may be noted in a port configuration selection section 1204 on the GUI configuration application screen 1200. The port configuration selection section 1204, in the illustrated embodiment, includes graphical elements for each port configuration selected in the saved port configurations section 1202 (e.g., ports 1, 6, and 18 in the illustrated embodiment), along with graphical elements for each of the networking devices 204 and 206 that include selectable port buttons for each off the ports on those networking devices. In an embodiment, the user of the management device 800 may use the GUI configuration application screen 1200 to select port buttons by "dragging and dropping" those port buttons to the graphical elements for each port configuration selected in the saved port configurations section 1202 (as illustrated in FIGS. 12a and 12b), and then may apply the port configuration replication information identified from each of the ports on the networking device 202 by selecting an apply button 1206 in order to apply the designated port configuration replication information to the selected ports on the networking devices 204 and/or 206 (e.g., the port configuration replication information for port 1 on networking device 202 to port 1 on networking device 204 and port 1 on networking device 206; the port configuration replication information for port 6 on networking device 202 to port 2 on networking device 204; and the port configuration replication information for port 18 on networking device 202 to port 3 on networking device 204, port 6 on networking device 204, and port 9 on networking device 206, as illustrated in FIG. 12b.) As discussed above, in the such embodiments the management engine 404 may access (e.g., in the background) the GUI configuration application screen for each port that is receiving a configuration, and provide port configuration replication information in the fields of the respective port configuration section for that port in order to configure each of the ports in substantially the same manner discussed above. As such, multiple port configurations may be replicated on multiple different ports at the same time.

Thus, systems and methods have been described that provide for configuration replication by copying configuration details that are displayed on a configuration GUI for a first device, to a clipboard or other memory location. Those configuration details are then analyzed to identify configuration replication information, and that configuration replication information may then be copied from the clipboard or other memory location to fields in a second device configuration GUI for a second device in order to replicate a configuration on the first device to a second device. As such, a configuration for a device may be replicated without the need to copy a running configuration from that device, and thus without the need for a telnet connection and/or other connection through a serial port that is necessary in conventional systems in order to read the running configuration of the device, as well as without the need to scan for configuration information each time that configuration information is to be used to configure another device. The replication of configurations in this manner operates across separate browser sessions, and provides for the replication of any particular configuration on multiple different devices at once.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A port configuration replication system, comprising:
a first networking device including a first port;
a second networking device including a second port; and
a management device that is configured to:
    communicate with the first networking device to provide a first networking device Graphical User Interface (GUI) that displays port configuration details for the first port;
    copy, from the first networking device GUI, text information displayed in the first networking device GUI, wherein the text information includes the port configuration details that are displayed as text in the first networking device GUI;
    analyze the port configuration details included in the text information that was copied in order to identify port configuration replication information and at least one port configuration detail that is not the port configuration replication information, wherein the analyzing includes:
        parsing a text file that includes the text information that was copied and that includes the port configuration details;
        recognizing at least one port configuration detail in the text file that is not relevant to replicating port configurations; and
        removing the at least one port configuration detail in the text file that is not relevant to the replication port configurations;
    communicate with the second networking device to display a second networking device GUI that provides for configuration of the second port; and
    provide text information from the text file for the port configuration replication information in the second networking device GUI in order to provide for the configuration of the second port while not providing text information in the second networking device GUI for the at least one port configuration detail that is not the port configuration replication information and that was removed from the text file.

2. The port configuration replication system of claim 1, wherein the communicating with the first networking device to provide the first networking device GUI includes:
providing port configuration information in the first networking device GUI to provide for configuration of the first port, wherein the configuration of the first port results in the first networking device GUI displaying the port configuration details for the first port.

3. The port configuration replication system of claim 1, wherein the copying the port configuration details includes copying the port configuration details to a clipboard in the management device.

4. The port configuration replication system of claim 1, wherein the analyzing the port configuration details to identify the port configuration replication information includes:
parsing the text file that includes the port configuration details;
recognizing at least one port configuration category in the text file; and
identifying respective port configuration replication information associated with each at least one port configuration category that was recognized in the text.

5. The port configuration replication system of claim 1, further comprising:
a third networking device including a third port, wherein the management device is configured to:
communicate with the third networking device to display the second networking device GUI that provides for the configuration of the second port and the third port; and
provide the port configuration replication information in the second networking device GUI in order to provide for the configuration of the third port.

6. The port configuration replication system of claim 1, wherein the management device is configured to:
provide the first networking device GUI in a first Internet browser session, and
provide the second networking device GUI in a second Internet browser session that is different than the first Internet browser session.

7. The port configuration replication system of claim 1, wherein the providing the port configuration replication information in the second networking device GUI includes pasting the port configuration replication information into respective fields provided in the second networking device GUI.

8. An Information Handling System (IHS), comprising:
a communication subsystem;
a processor that is coupled to the communication subsystem; and
a memory system that is coupled to the processor and that include instruction that, when executed by the processor, cause the processor to provide a management engine, the processor is configured to:
provide for display, in response to communication with a first networking device having a first port, a first networking device Graphical User Interface (GUI) that displays port configuration details for the first port;
copy, from the first networking device GUI, text information displayed in the first networking device GUI, wherein the text information includes the port configuration details that are displayed as text in the first networking device GUI;
analyze the port configuration details included in the text information that was copied in order to identify port configuration replication information and at least one port configuration detail that is not the port configuration replication information, wherein the analyzing includes:
parsing a first text file that includes the text information that was copied and that includes the port configuration details;
recognizing at least one port configuration detail in the first text file that is not relevant to replicating port configurations; and
creating a second text file that does not include the at least one port configuration detail that is not relevant to the replicating port configurations;
provide for display, in response to communication with a second networking device having a second port, a second networking device GUI that provides for the configuration of the second port; and
provide text information from the second text file for the port configuration replication information in the second networking device GUI in order to provide for the configuration of the second port while not providing text information in the second networking device GUI for the at least one port configuration detail that is not port configuration replication information.

9. The IHS of claim 8, wherein the communicating with the first networking device to provide the first networking device GUI includes:
providing port configuration information in the first networking device GUI to provide for configuration of the first port, wherein the configuration of the first port results in the first networking device GUI displaying the port configuration details for the first port.

10. The IHS of claim 8, wherein the copying the port configuration details includes copying the port configuration details to a clipboard in the memory system.

11. The IHS of claim 8, wherein the analyzing the port configuration details to identify the port configuration replication information includes:
parsing the first text file that includes the port configuration details;
recognizing at least one port configuration category in the first text file; and
identifying respective port configuration replication information associated with each at least one port configuration category that was recognized in the first text file, wherein the second text file includes the respective port configuration replication information.

12. The IHS of claim 8, wherein the processor is configured to:
provide for display, in response to communication with a third networking device having a third port, the second networking device GUI that provides for the configuration of the second port and the third port; and
provide the port configuration replication information in the second networking device GUI in order to provide for the configuration of the third port.

13. The IHS of claim 8, wherein the processor is configured to:
provide the first networking device GUI in a first Internet browser session, and provide the second networking device GUI in a second Internet browser session that is different than the first Internet browser session.

14. The IHS of claim 8, wherein the providing the port configuration replication information in the second networking device GUI includes pasting the port configuration replication information into respective fields provided in the second networking device GUI.

15. A method for configuration replication, comprising:
providing for display, by a management device, a first networking device Graphical User Interface (GUI) that displays port configuration details for a first port on a first networking device;
copying, by the management device and from the first networking device GUI, text information displayed in the first networking device GUI, wherein the text information includes the port configuration details that are displayed as text in the first networking device GUI;
analyzing, by the management device, the port configuration details included in the text information that was copied in order to identify port configuration replication information and at least one port configuration detail that is not the port configuration replication information, wherein the analyzing includes:
parsing a text file that includes the text information that was copied and that includes the port configuration details;
recognizing at least one port configuration detail in the text file that is not relevant to replicating port configurations; and
removing the at least one port configuration detail in the text file that is not relevant to the replication port configurations;
providing for display, by the management device, a second networking device GUI that provides for configuration of a second port on a second networking device; and
providing, by the management device using the text file, the port configuration replication information in the second networking device GUI in order to provide for the configuration of the second port while not providing text information in the second networking device GUI for the at least one port configuration detail that is not the port configuration replication information and that was removed from the text file.

16. The method of claim 15, wherein the communicating with the first networking device to provide the first networking device GUI includes:
providing, by the management device, port configuration information in the first networking device GUI to provide for configuration of the first port, wherein the configuration of the first port results in the first networking device GUI displaying the port configuration details for the first port.

17. The method of claim 15, wherein the copying the port configuration details includes copying the port configuration details to a clipboard in a memory system.

18. The method of claim 15, wherein the analyzing the port configuration details to identify the port configuration replication information includes:
parsing, by the management device, the text file that includes the port configuration details;
recognizing, by the management device, at least one port configuration category in the text file; and
identifying, by the management device, respective port configuration replication information associated with each at least one port configuration category that was recognized in the text file.

19. The method of claim 15, further comprising:
providing for display, by the management device, the second networking device GUI that provides for the configuration of the second port and a third port on a third networking device; and
providing, by the management device, the port configuration replication information in the second networking device GUI in order to provide for the configuration of the third port.

20. The method of claim 15, further comprising:
providing, by the management device, the first networking device GUI in a first Internet browser session, and
providing, by the management device, the second networking device GUI in a second Internet browser session that is different than the first Internet browser session.

* * * * *